Patented June 29, 1948

2,444,217

UNITED STATES PATENT OFFICE 2,444,217

METHOD OF TREATING COFFEE

Arthur L. Armentrout, Long Beach, Calif., assignor of one-half to Richard B. Coffman, Long Beach, Calif.

No Drawing. Application August 12, 1944, Serial No. 549,283

3 Claims. (Cl. 99—68)

This invention relates to a method of preparing or treating coffee beans preparatory to the brewing or making of a beverage therefrom, and it is an object of the invention to provide a method whereby it becomes unnecessary to store the raw beans for long periods of time prior to roasting and whereby the transformation or conversion effected by the treatment is such as to produce an improved product from which to brew a beverage.

This application is filed as a continuation of and to take the place of my copending application entitled "Method of treating coffee," Serial No. 500,543, filed August 30, 1943, now abandoned.

Coffee nibs or coffee beans, as they are called, contain elements which, after the beans have been roasted and ground or crushed and brewed, give the resulting beverage desired qualities of flavor and aroma. These elements are generally recognized as volatile and unstable.

The coffee beans, when harvested or picked and then processed in the usual manner at the plantation, contain a substantial percentage of moisture, the presence of which is undesirable when the beans are roasted. It is, therefore, common to allow the beans to dry out or age before being roasted. Under ordinary circumstances the aging process takes several years and, as a general rule, the longer the beans are allowed to age the drier they become and the better they are for roasting.

It is well recognized that as ordinary coffee beans are roasted at atmospheric pressure they throw off quantities of aromatic or volatile values including values sought in the finished brew. Attempts have been made to catch the elements thrown off during roasting and to recharge the beans with such elements as they cool. Such methods are, however, generally not satisfactory as the elements liberated from the beans are subject to oxidation and if they could be successfully returned to the beans they would not be in their original condition.

It is a primary object of my invention to provide a method of treating coffee beans so that they can be brewed into a beverage of high quality and will make far more beverage of high quality than can be made when ordinary methods are followed. Coffee beans treated by my method will produce as much as twice the quantity of brew or beverage as they will when treated by the usual method now commonly used.

An object of the present invention is to provide a method of treating coffee under which the beans are dehydrated without affecting the volatile elements and are then roasted under conditions to preserve the volatile elements in the beans and to do so without oxidation. By the invention the dehydration or aging is carried out under subatmospheric pressure to induce the rapid liberation of moisture from the beans and the roasting is carried out under superatmospheric pressure and in a non-oxidizing atmosphere, so that the volatile elements are retained in the beans and are subjected to the necessary heat treatment without danger of oxidation.

An object of the present invention is to dehydrate the coffee beans under conditions which speed up the aging process from a matter of years to a matter of days, and to do this without partially roasting or oxidizing the beans or affecting the elements which give quality to the final brew.

Another object of the invention is to roast the beans in a manner and under conditions so that they are effectively heat treated or roasted without driving off the volatile elements and without exposure to oxidation.

Another object of my invention is to provide a method of treating coffee whereby its brew making strength is greatly increased. By my invention I am able to produce as much as four times as much coffee from a given quantity of beans as can be obtained by the usual methods.

The various objects and features of my invention will be fully understood from the following detailed description of typical preferred manners of carrying out the method of the invention.

The method provided by this invention is applicable, generally, to the treatment or processing of coffee beans. It is well known, of course, that there are various varieties of coffee beans used for beverage purposes, and that these beans vary considerably in their characteristics. It is also well known that there is a wide variety of taste in the matter of coffee as a beverage and that the quality of taste is subject to considerable control through the manner of preparation of the coffee beans.

In the following description details will be given concerning a typical, average treatment for ordinary or average coffee beans. It is to be understood, however, that the broader principles of the invention are applicable to coffee beans of various types or varieties and that in practice the characteristics of the beans being treated and the taste to be satisfied will govern, to a certain degree, the details of the process. For example, they may govern the temperature and pressure at which the roasting is carried out, or the time during which roasting is carried out, or both.

The first step of the process involves dehydration or artificial aging of the coffee beans. The beans are first placed in a closed container or vessel in the presence of, but out of contact with, a moisture absorbent material. The particular character of the vessel or its features of construction will, in practice, vary with the quantity of beans being treated or, in other words, upon the scale on which the process is being carried out, and upon other like factors.

The material used in the presence of the coffee beans in the closed vessel may be any material that will absorb moisture without otherwise affecting the atmosphere in the vessel or without in any way influencing the coffee beans contained therein. In practice calcium chloride, or the like, may be used for this purpose. The quantity employed may be regulated to the amount of moisture to be absorbed. Experience has indicated that about eight to ten per cent of the initial weight of the coffee beans is removed by the dehydrating process.

In accordance with the invention the dehydration of the beans is introduced by the application of a suitable amount of heat. In practice it has been found that a heat up to about 140° to 150° F., which may be termed a slow or drying heat, is effective and does not roast or affect the beans other than to drive off the moisture.

In accordance with the invention a sub-atmospheric pressure is maintained in the vessel while the beans are being dehydrated or artificially aged. The present method provides for withdrawing the air from the vessel by what is popularly termed as drawing a vacuum on the vessel. In practice a reduced pressure in the neighborhood of 25 to 28 inches of vacuum may be drawn upon the vessel and maintained during the dehydration period.

The dehydration is preferably carried out until the coffee beans are dry or, in other words, substantially free of all moisture. In practice when treating ordinary beans that have not been aged or have only been aged a short time, it is generally found that by subjecting the beans to a slow or drying heat such as has been indicated, under a sub-atmospheric pressure such as has been indicated, for a period of several days or a week, the beans will be reduced in weight around eight to ten per cent or, in other words, moisture amounting to about eight to ten per cent of the beans is driven off.

The beans thus dehydrated or aged are then removed from the drying vessel and are placed in a roaster. In carrying out the invention the roaster is in the form of a closed or tight vessel, and as an initial step in the final or roasting process, air is removed from the vessel or from the presence of the beans. This may be done in various manners. However, in practice and in accordance with the preferred form of the invention it is done by introducing an inert gas into the roaster to displace the air. This gas may, in practice, be carbon dioxide which is a common inert gas effective in maintaining a non-oxidizing atmosphere within the roaster.

The beans in the tightly closed roaster and in the presence of the non-oxidizing atmosphere above referred to are subjected to a roasting heat or roasting temperature. I have found it most effective to roast the beans at a fairly high temperature and for a period of about twenty-one or twenty-two minutes. I prefer to start the roasting by the application of heat at a temperature of about 405° F. to 410° F. In the first stage of the roasting and possibly for the first ten minutes the temperature will drop. It may drop to about 385° F. to 390° F. and then it will return to the initial temperature so it is at maximum temperature when the roasting is complete. As far as I have been able to determine, the drop in the temperature is occasioned by an absorption of heat by the beans.

In practice, as more heat is applied, or as more pressure is applied, or as both heat and pressure are increased, the roasting time may be shortened. However, it is impractical to apply much more than 410° F. as an increase above 410° F. may cause scorching of the beans. The heat and pressure act on the beans so that the desired cracking, conversion, or treatment of the elements in the beans occurs. The pressure maintained on the beans prevents the escape of the volatile elements.

It is to be understood, of course, that during the roasting operation the beans are agitated to prevent burning and so that the roast is uniform. It is also to be understood that in practice any suitable mechanical devices or features of construction may be utilized in carrying out the roasting operation referred to.

In accordance with the invention the volatile elements present in the beans are retained therein during the roasting operation through pressure. During the roasting operation pressure is maintained on the roaster or on the atmosphere in the roaster, so that any tendency for volatile elements of the beans to be driven off is counteracted. In practice it has been found that a superatmospheric pressure of about 200 pounds or more per square inch will operate to effectively prevent liberation of the volatile elements under the temperature conditions mentioned.

The roasting operation under the preferred conditions stated above will, in practice, require about twenty-one or twenty-two minutes. In practice the time for roasting may vary a few minutes more or less than the time stated.

Through the roasting operation just described the invention provides for effective and thorough roasting of the beans without exposing them to conditions under which oxidation can take place and without allowing the escape of volatile elements therefrom.

Following the roasting operation the beans are discharged from the roaster and rapidly cooled to normal temperature.

It has been found that when the beans have been treated as hereinabove set forth, they appear to be sealed, that is, the outer surface appears to be such as to prevent escape of the volatile or aromatic values to such an extent that the beans, following the roasting, are practically odorless, whereas coffee beans when roasted under ordinary circumstances are highly aromatic following the roasting operation. Further, the beans treated in accordance with the invention, being sealed, are stable and are not subject to deterioration such as is common in the case of coffee beans roasted under the ordinary methods. It is found, however, that when the beans treated in accordance with the invention are crushed or ground the aromatic or volatile elements are present and that a brew made therefrom is of definitely superior quality. The ground beans not only retain their strength but may be allowed to remain in contact with air for a very long time without deteriorating or turning rancid. It is unnecessary to use vacuum packing in handling the ground beans.

By providing a method of roasting coffee which is entirely independent of atmospheric conditions I am able to get uniformly good results in various localities and the results are not influenced by atmospheric humidity or atmospheric pressure.

When my method is followed in the preferred manner on ordinary coffee beans which have been strip picked and are not thoroughly ripe, and the resulting roasted beans are ground, they will make not only a very high quality and pleasing beverage but they will make about twice as much such beverage as can be made from beans of the same quantity of coffee treated in the ordinary manner. If beans have been picked ripe or are fully developed, the resulting brew will be considerably stronger than the brew resulting from beans picked in the usual commercial manner. Such brew will be from three to four times as strong as that made by the ordinary method.

Having described only typical preferred manners of carrying out the method of my invention, I do not wish to be limited or restricted to the specific details herein set forth, but wish to reserve to myself any variations or modifications that may appear to those skilled in the art or fall within the scope of the following claims:

Having described my invention, I claim:

1. The method of treatng coffee beans which includes placing them in a closed vessel and then withdrawing substantially all of the air from the vessel, subjecting the beans to heat of substantially 140° F. to 150° F. for a period of several days at a sub-atmospheric pressure out of the presence of air, then holding the beans confined in a vessel and displacing the air therefrom by carbon dioxide and then roasting the beans while confined in the vessel for a period of substantially 21 to 22 minutes in the presence of carbon dioxide and at a pressure of substantially two hundred pounds per square inch.

2. The method of treating coffee beans which includes placing them in a closed vessel and then withdrawing substantially all of the air from the vessel to create a vacuum of approximately 25 inches, subjecting the beans to heat of substantially 140° F. to 150° F. for a period of several days at a sub-atmospheric pressure out of the presence of air, then holding the beans confined in a vessel and displacing the air therefrom by carbon dioxide, and then roasting the beans while confined in the vessel for a period of substantially 21 to 22 minutes in the presence of carbon dioxide and at a pressure of substantially two hundred pounds per square inch.

3. The method of treating coffee beans which includes placing them in a closed vessel in the presence of a moisture-absorbing substance, and then withdrawing substantially all of the air from the vessel, subjecting the beans to heat of substantially 140° F. to 150° F. for a period of several days at a sub-atmospheric pressure out of the presence of air, then holding the beans confined in a vessel and displacing the air therefrom by carbon dioxide, and then roasting the beans while confined in the vessel for a period of substantially 21 to 22 minutes in the presence of carbon dioxide and at a pressure of substantially two hundred pounds per square inch.

ARTHUR L. ARMENTROUT.

REFERENCES CITED

The following references are of record in the file of this patent:

UNITED STATES PATENTS

| Number | Name | Date |
|---|---|---|
| 255,965 | Fleury et al. | Apr. 4, 1882 |
| 1,237,931 | Malverzin | Aug. 21, 1917 |
| 1,426,011 | Reynolds | Aug. 15, 1922 |
| 1,602,576 | Gant | Oct. 12, 1926 |
| 1,788,705 | Close | Jan. 13, 1931 |
| 2,062,109 | Rogers | Nov. 24, 1936 |
| 2,343,228 | Sperti | Feb. 29, 1944 |

FOREIGN PATENTS

| Number | Country | Date |
|---|---|---|
| 3,129 | Great Britain | 1901 |
| 24,400 | Great Britain | 1898 |
| 246,454 | Great Britain | 1926 |